Aug. 28, 1934.  E. H. ALLEN  1,971,593
CONVERTIBLE FIFTH WHEEL
Filed Nov. 8, 1933  2 Sheets-Sheet 1
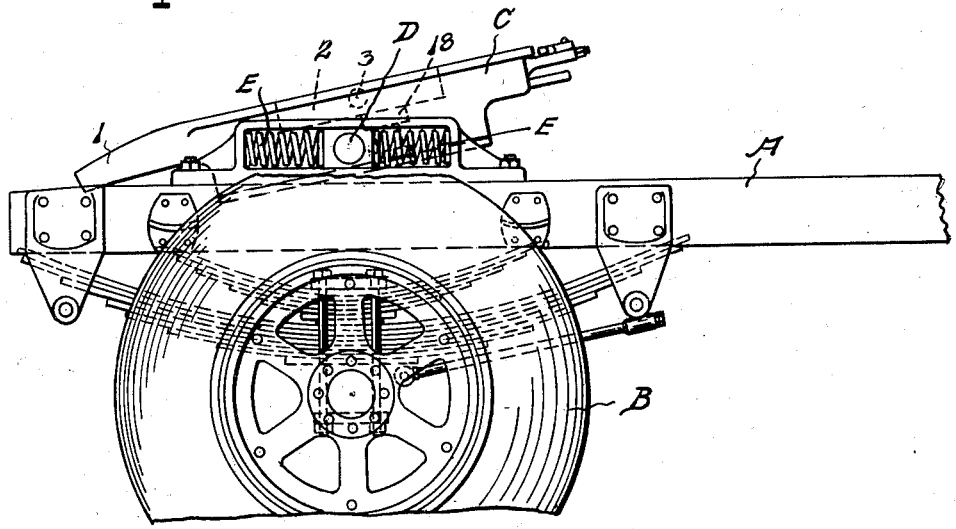
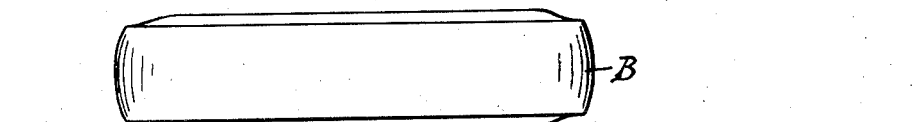
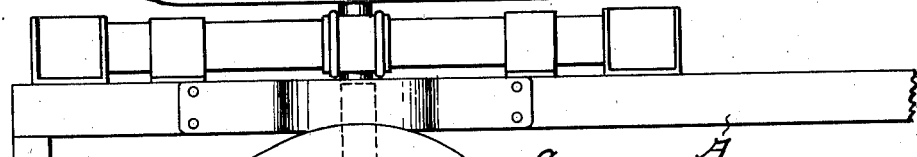
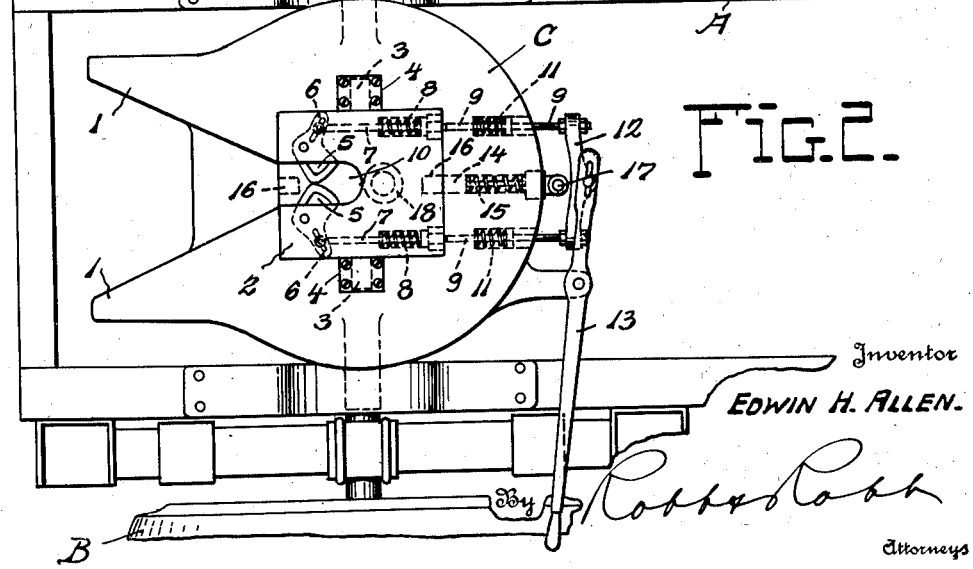
Inventor
EDWIN H. ALLEN Aug. 28, 1934.  E. H. ALLEN  1,971,593
CONVERTIBLE FIFTH WHEEL
Filed Nov. 8, 1933   2 Sheets-Sheet 2
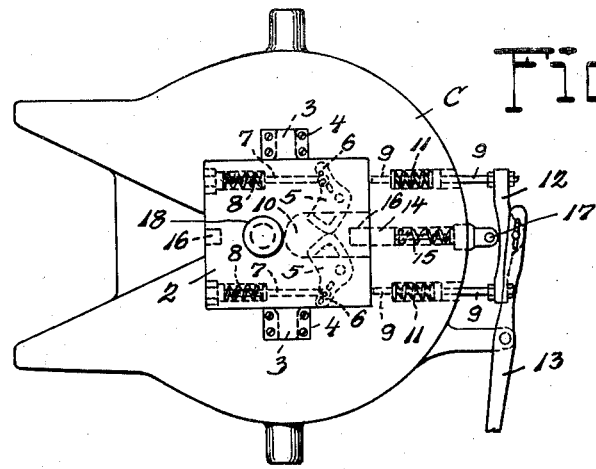
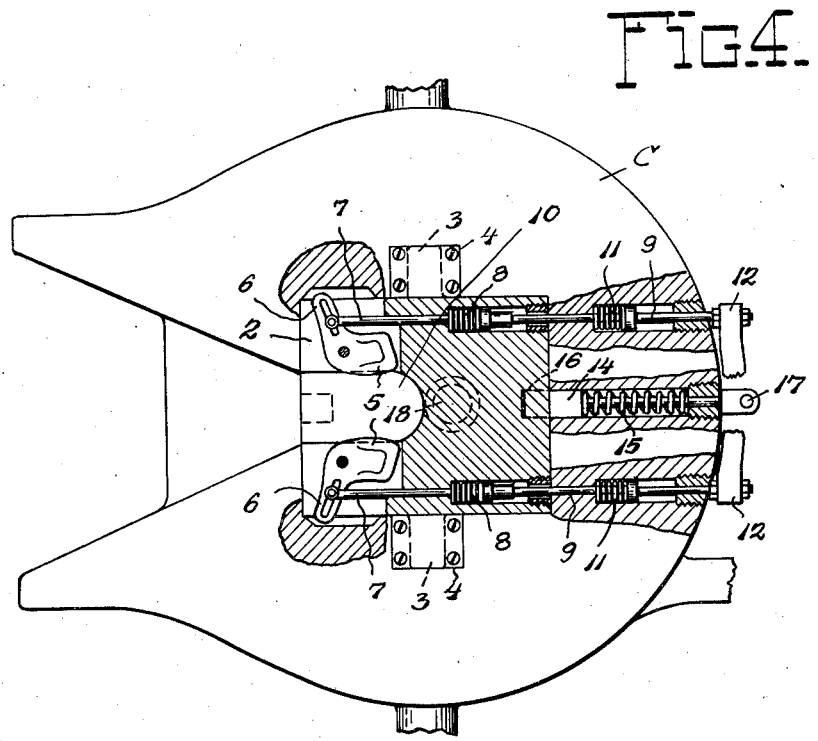
Inventor
EDWIN H. ALLEN.
By Robb & Robb
Attorneys Patented Aug. 28, 1934

1,971,593

UNITED STATES PATENT OFFICE 1,971,593

CONVERTIBLE FIFTH WHEEL

Edwin Howe Allen, Edgerton, Wis., assignor to Highway Trailer Company, Edgerton, Wis., a corporation Application November 8, 1933, Serial No. 697,212

6 Claims. (Cl. 280—33.1)

The purpose of this invention is to improve upon known constructions of fifth wheels of the type usually carried by tractors for supporting the front ends of semi-trailers, tractor-trailer vehicles of this type being usually known as six wheel trailer combination vehicles.

In the above class of vehicles, the tractor is a four wheel motor propelled construction, and the trailer is equipped with ground wheels at its rear end, and a fifth wheel at its front end to cooperate and become locked to the fifth wheel of the tractor.

The tractor vehicle fifth wheel may be equipped with a male coupling member, such as a king pin, or the fifth wheel may have so-called female coupling instrumentalities designed to cooperate with a king pin fifth wheel on a tractor.

Under the foregoing conditions, it is apparent that in order to enable the tractor fifth wheel to cooperate and become locked to the different types of trailer vehicles equipped with either the male or female type of coupling fifth wheels, it is necessary for the fifth wheel on the tractor vehicle, or that of the trailer vehicle, to have alternatively usable coupling parts capable of engaging or cooperating with either the male or female type of fifth wheel coupling.

With the above in mind, I have invented a specific form of fifth wheel utilizing a double acting invertible coupling unit mounted on the fifth wheel and carrying alternatively usable male and female coupling devices. When the unit is turned into one of its positions to be assumed relatively to the fifth wheel body, the female coupling instrumentalities are operative, and when the unit is turned in a reverse manner, in which it is completely inverted, the male coupling instrumentality becomes operative.

A construction such as above proposed, offers many advantages over that type of fifth wheel which embodies only a single form of coupling device of either the male or female type because my invertible and convertible coupling unit is susceptible of rendering the vehicle with which it is equipped able to couple with either a female or male coupling device upon the other vehicle with which it is to be connected.

Along with the above main feature of my invention, I utilize special subsidiary features in the form of a novel locking contrivance for holding the coupling member unit in either of its reversed positions, and special actuating means for the locking latches that form a part of the female coupling member of the said unit.

In the accompanying drawings,

Figure is a side elevation of a fifth wheel embodying the invention as such fifth wheel may be mounted upon a tractor vehicle, though said fifth wheel may be utilized upon a trailer vehicle by placing it in a position in which it is inverted with respect to the position in which it is illustrated in Figure 1.

Figure 2 is a top plan view of the fifth wheel and coupling unit and operating parts as shown in Figure 1, the female coupling parts being operatively positioned.

Figure 3 is a view similar to Figure 2, but in which the female coupling member is in operative position, the coupling unit member having been inverted.

Figure 4 is a view somewhat similar to Figure 2, but showing the actuating rods pressed in for the purpose of releasing the locking latches of the female coupling member.

In the drawings, A designates the chassis of a vehicle unit of a six wheel tractor-trailer combination, said chassis having supporting wheels B and carrying thereon, in a well known manner, the fifth wheel C. The fifth wheel C is generally of a known type such as shown in the Martin and Farr United States Letters Patent No. 1,412,025, this known type, embodying what is called a split fifth wheel construction wherein the fifth wheel body is provided with rearwardly extending guides 1, between which a king pin or male coupling member is adapted to ride as it enters into locking engagement with the female locking or coupling members carried by the fifth wheel C.

Now in carrying out my invention, I provide at about the central portion of the fifth wheel C a coupling member unit in the form of an invertible plate, or carrier member 2. This carrier member 2 is journaled at its opposite side edges, as shown at 3, in suitable bearings provided in the body portion of the fifth wheel C, the central portion of which is cut away so that the plate or carrier 2 may be received in the cut away portion with its upper surface about flush with the upper surface of the fifth wheel C.

Suitable bearing plates 4 extend over the journals 3, and retain same within the bearings in the fifth wheel C provided therefor. By this mounting of the carrier 2, it is susceptible of being turned or rotated so as to bring either its upper or lower surface flush or substantially aligned with the upper surface of the fifth wheel C. The carrier 2 is equipped with king pin engaging and locking latches 5, the outer arms 6 of which are slotted, and pivotally connected with actuating rods 7 that slide on the carrier or plate 2. Normally springs 8 coact with the rods 7 to hold the latches 5 in their locking positions shown in Figure 2, as distinguished from their unlocked positions as shown in Figure 4. Mounted on the rear of the fifth wheel are auxiliary actuating rods 9 arranged in a position to substantially align with the rods 7 when the carrier 2 is in the position of Figure 2, i. e., with the female coupling parts rendered operative.

The carrier 2 is formed with a recess 10 across which the latch members 5 extend when they are in their locking positions to hold a king pin coupled or connected with the fifth wheel C.

The rods 9 are spring pressed outwardly by springs 11 so that normally they are not interengaged with the adjacent edge portion of the carrier or coupling member unit 2, thus enabling this coupling member unit 2 to be turned for purposes of inverting same, when it is unlocked. However, the auxiliary actuating rods 9 are connected together by a yoke 12 operable by a hand lever 13 to shift the rods 9 longitudinally of the fifth wheel C and thereby engage said rods 9 with the rods 7, which when pushed longitudinally, will rock the latch members to carry same to king pin releasing positions as illustrated in Figure 4.

Normally, the coupling member unit or carrier 2 is always locked in either of its two invertible positions. The lock member employed is a lock bar 14 spring pressed by a spring 15 to engage in either one of recesses 16 in the opposite edge portions of the coupling member unit 2. An eye 17 at the outer end of the locking bar 14 may be connected with a handle or like operating member by a cable or rod, and thus the operator of the vehicle can readily unlock the member 2 by pulling on the locking bar 14 in a self evident manner.

As indicated above, the coupling member unit or coupling unit 2 is equipped with the female coupling parts comprising the members 5 and the recess 10, and these parts are operative to engage a king pin on a fifth wheel that mates with the fifth wheel C. If, however, the said mating fifth wheel is equipped with female coupling parts, then the coupling unit 2, as shown in Figure 2, is inverted to occupy the position of Figure 3, and this brings into an upwardly projecting operative position, the king pin 18 that according to the arrangement in Figure 2 projects downwardly from the unit 2, but according to the arrangement of said unit 2 in Figure 3, projects upwardly from said unit.

The operation of my invention is self evident from the foregoing, as it simply involves a disengagement of the locking bar 14 in order to turn the unit 2 to a properly inverted position whereby to render active either the latch members 5 to act as a female coupling device, or to render active the king pin 18 to act as a male coupling device. The parts 9 and 13 are only employed or useful when the female coupling latch members 5 are being employed.

The fifth wheel C is normally inclined as shown in Figure 1, when attached to the rear end of a tractor vehicle chassis A. It is pivoted to rock about the main shaft bearing support D, and is equipped with the usual spring bumpers E to act as buffers for taking up shock incident to coupling.

Having thus described my invention, what I claim as new and desire to secure by Letters Patent of the United States, is:—

1. In combination with a vehicle, a fifth wheel thereon for cooperation with another vehicle to support and couple the latter, and a coupling unit carried by said fifth wheel and comprising alternatively usable coupling parts, together with mounting means for enabling inverting of said coupling unit whereby to bring one or the other of the alternatively usable coupling parts into active position for use.

2. In combination with a vehicle, a fifth wheel thereon for cooperation with another vehicle to support and couple the latter, and a coupling unit carried by said fifth wheel and comprising alternatively usable coupling parts, together with mounting means for enabling inverting of said coupling unit whereby to bring one or the other of the alternatively usable coupling parts into active position for use, said alternatively usable coupling parts comprising female coupling means including latches, and a male coupling means including a king pin, with actuating parts carried by the fifth wheel for cooperation with the latches on the coupling unit to effect release thereof.

3. A convertible fifth wheel comprising a coupling unit mounted thereon and rotative in a vertical plane, alternatively usable male and female coupling parts on said unit, lock means for holding said unit in either of two positions in which positions one of the alternatively usable coupling parts is operative, and actuating mechanism on the fifth wheel cooperative with the female coupling parts to effect release thereof.

4. A convertible fifth wheel for trailer-tractor combination vehicles, comprising a fifth wheel body, a coupling unit mounted at the central portion of the body and rotative in a vertical plane to occupy inverted positions, female coupling means on said unit rendered operative when the unit is in one of its inverted positions, male coupling means on said unit rendered operative when the coupling unit is in the other of its inverted positions, and locking means engageable with said unit and carried by the fifth wheel to lock the unit in either of its inverted positions in which one or the other of the female and male coupling parts is active.

5. A convertible fifth wheel for trailer-tractor combination vehicles, comprising a fifth wheel body, a coupling unit mounted at the central portion of the body and rotative in a vertical plane to occupy inverted positions, female coupling means on said unit rendered operative when the unit is in one of its inverted positions, male coupling means on said unit rendered operative when the coupling unit is in the other of its inverted positions, and locking means engageable with said unit and carried by the fifth wheel to lock the unit in either of its inverted positions in which one or the other of the female and male coupling parts is active, the female coupling parts including rocking latches carried by said unit, actuating rods to effect release movement of said latches, actuating rods on the fifth wheel to cooperate with the first mentioned actuating rods, and manual means for actuating the last mentioned actuating rods.

6. A convertible fifth wheel for tractor-trailer combination vehicles, comprising a body cut away at its central portion, an invertible coupling unit mounted in the said cut away portion of the body, journals supporting said coupling unit to turn in a vertical plane in order that it may be inverted to occupy either of opposite positions, female coupling parts on said unit rendered active when the unit is in one of its positions, a male coupling part on said unit rendered active when the unit is in the other of its inverted positions, a lock member engageable with the unit in both of its inverted positions to prevent said unit from turning or movement when adjusted for the use of either the female or the male coupling devices, and actuating means for the female coupling parts carried by the said fifth wheel.

EDWIN HOWE ALLEN.